(12) United States Patent
Rosal et al.

(10) Patent No.: US 11,534,855 B2
(45) Date of Patent: Dec. 27, 2022

(54) FRICTION STIR PROCESSING TIP, APPARATUS, AND METHOD

(71) Applicant: Mazak Corporation, Florence, KY (US)

(72) Inventors: David Rosal, West Bountiful, UT (US); Scott Packer, Highland, UT (US); Rodney Dale Fleck, Draper, UT (US); Russell J. Steel, Draper, UT (US)

(73) Assignee: Mazak Corporation, Florence, KY (US)

( * ) Notice: Subject to any disclaimer, the term of this patent is extended or adjusted under 35 U.S.C. 154(b) by 64 days.

(21) Appl. No.: 17/077,749

(22) Filed: Oct. 22, 2020

(65) Prior Publication Data
US 2021/0121977 A1 Apr. 29, 2021

Related U.S. Application Data

(60) Provisional application No. 62/925,497, filed on Oct. 24, 2019.

(51) Int. Cl.
*B23K 20/00* (2006.01)
*B23K 20/12* (2006.01)

(52) U.S. Cl.
CPC .................. *B23K 20/1255* (2013.01)

(58) Field of Classification Search
CPC . B23K 20/1255; B23K 20/1215; B23K 20/26
See application file for complete search history.

(56) References Cited

U.S. PATENT DOCUMENTS

| | | | | |
|---|---|---|---|---|
| 8,910,851 | B2* | 12/2014 | Rosal .................. | B23K 20/1255 228/2.1 |
| 9,764,375 | B2 | 9/2017 | Miles et al. | |
| 2006/0032887 | A1 | 2/2006 | Haynie | |
| 2006/0043152 | A1* | 3/2006 | Stol ..................... | B23K 20/1255 228/2.1 |
| 2008/0217377 | A1* | 9/2008 | Stol ..................... | B23K 20/1255 228/2.3 |
| 2011/0214799 | A1 | 9/2011 | Szymanski et al. | |

(Continued)

FOREIGN PATENT DOCUMENTS

| | | |
|---|---|---|
| CN | 108555433 A | 9/2018 |
| WO | 2017102953 A1 | 6/2017 |

OTHER PUBLICATIONS

Invitation to Pay Additional Fees and, Where Applicable, Protest Fee issued in corresponding International Patent Application No. PCT/US2020/057007, mailed Dec. 9, 2020, 2 pages.

(Continued)

*Primary Examiner* — Erin B Saad
(74) *Attorney, Agent, or Firm* — Fitch, Even, Tabin & Flannery LLP

(57) ABSTRACT

In one aspect of the present disclosure, a friction stir processing tip is provided for a friction stir processing device. The friction stir processing tip includes a body having a central longitudinal axis, a friction stir processing portion of the body, and a connecting portion of the body configured to connect to a tip holder of the friction stir processing device. The connecting portion includes splines configured to receive a torque from the tip holder for rotating the body about the central longitudinal axis.

40 Claims, 6 Drawing Sheets

(56) References Cited

U.S. PATENT DOCUMENTS

2013/0068825 A1\* 3/2013 Rosal .................... B23K 37/08
228/2.1
2015/0291479 A1\* 10/2015 Yao ..................... C04B 35/5831
501/153
2017/0274472 A1\* 9/2017 Maruko ............. B23K 20/1255

OTHER PUBLICATIONS

Drawings of a friction stir welding tool and a threaded tip that threads into a tool body, the friction stir welding tool and the threaded tip publicly available before Oct. 24, 2019.
Notification of Transmittal of International Search Report and Written Opinion issued in corresponding International Application No. PCT/US2020/057007, dated Feb. 26, 2021, 16 pages.

\* cited by examiner

FRICTION STIR PROCESSING TIP, APPARATUS, AND METHOD

CROSS-REFERENCE TO RELATED APPLICATION

This application claims the benefit of U.S. Provisional Application No. 62/925,497, filed Oct. 24, 2019, which is incorporated by reference in its entirety herein.

TECHNICAL FIELD

This disclosure relates generally to a tip for a friction stir processing device.

BACKGROUND

Friction stir processing of metals may include, for example, friction stirring of a workpiece to refine grain structure in a workpiece. As other examples, friction stir processing may include friction stir welding of two or more workpieces and friction stir riveting.

In one approach, a friction stir processing tool is coupled to a rotatable spindle of a machine. The friction stir processing tool includes a friction stir processing tip and a body. In one type of friction stir processing device, the friction stir processing tip is intended to be removed from the body and replaced at the end of the lifespan of the friction stir processing tip.

To connect a friction stir processing tip to the body, the body has a socket that receives the friction stir processing tip and the friction stir processing tip has a recess that receives a set screw of the body. The friction stir processing tip also has threads that engage threads of the body to center and secure the friction stir processing tip within the body. The threads of the friction stir processing tip and the body are configured to have a rotational removal direction for the friction stir processing tip that is opposite the direction of rotation of the spindle to inhibit the threaded connection from loosening during a friction stir processing operation. Once the friction stir processing tip has worn out, the set screw of the body is disengaged from the friction stir processing tip and the friction stir processing tip is unthreaded from the body. A new friction stir processing tip may then be loaded into the body.

In one embodiment, the friction stir processing tip may include a pin and a shoulder having surface features and/or material that provide a superabrasive surface for frictionally engaging workpieces to be friction stir welded. As the rotating friction stir processing tip is moved along the workpieces, the pin and shoulder frictionally engage the two workpieces, plasticize the metallic material of the workpieces, and stir the plasticized material to form a weld between the workpieces.

There are a number of factors that may cause the friction stir processing tip to bind in the body, requiring replacement of both the friction stir processing tip and the body. For example, the machine spindle may press the friction stir processing tool against the workpieces in the Z-axis direction with high force, such as 8,000 lbs. The machine spindle may also impart a large torque on the body and the friction stir processing tip held therein in order to rotate the friction stir processing tip at high speeds, such as in excess of 10,000 rotations per minute. The workpieces being friction stir welded may also impart a lateral load on the friction stir processing tip that resists movement of the rotating friction stir processing tip across the workpieces. This lateral load may be around 2,000 lbs in some applications. Further, the friction stir processing tip may reach or exceed 500 degrees Celsius during the friction stir welding operation which causes the friction stir processing tip to expand. The body of the friction stir processing tool may experience lower temperatures than the friction stir processing tip and expands less during the friction stir processing operation.

The axial loading, torque, lateral load, and high temperatures experienced by the friction stir processing tip have been found to bind the engaged threads of the friction stir processing tip and the body. Binding between the friction stir processing tip and the holder may compromise the holder and require replacement of both the holder and the friction stir processing tip.

Figure 1:
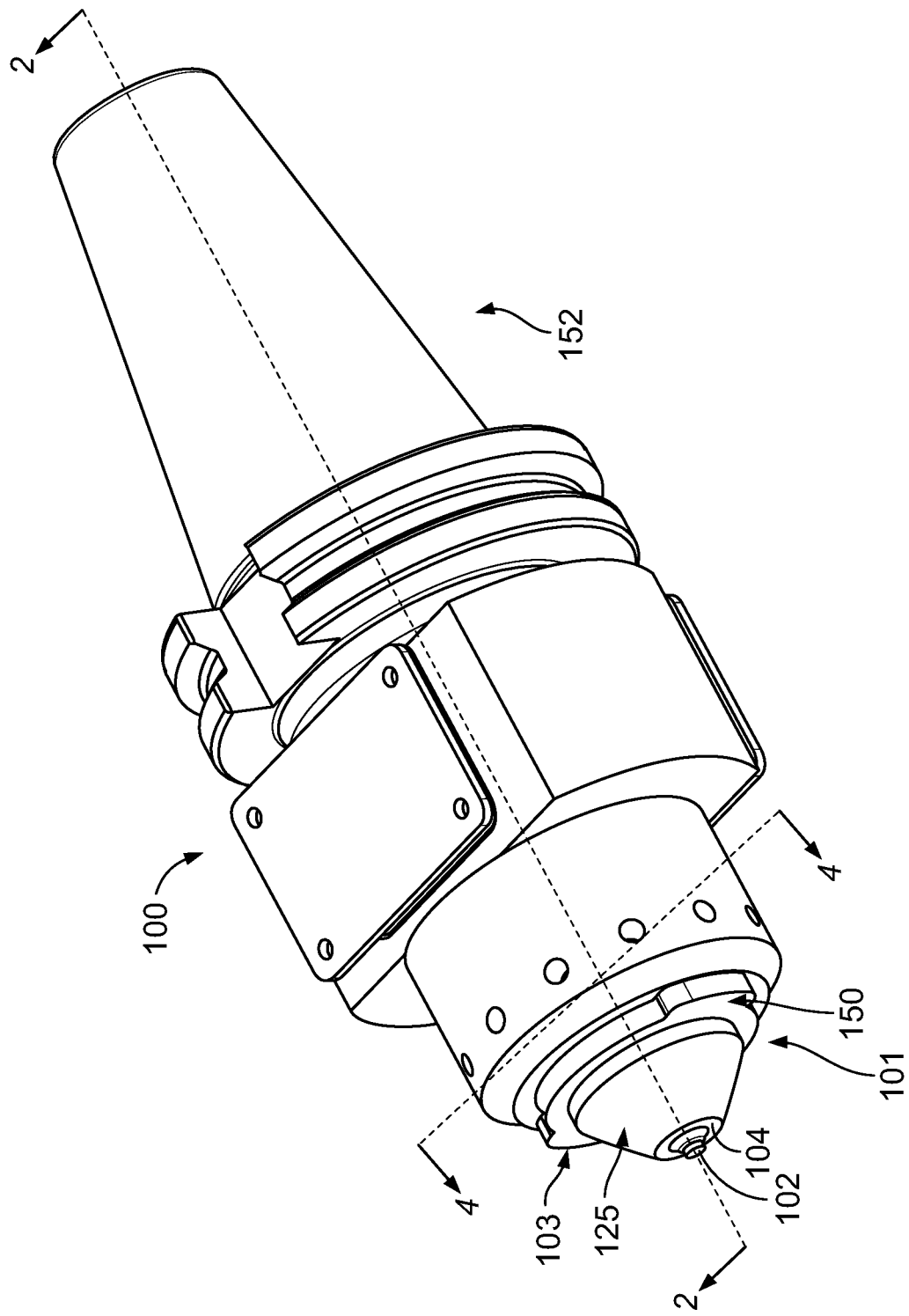
FIG. 1 is a perspective view of a friction stir processing device having a friction stir processing tip.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one aspect of the present disclosure, a friction stir processing tip is provided for a friction stir processing device. The friction stir processing tip includes a body having a central longitudinal axis, a friction stir processing portion of the body, and a non-threaded connecting portion of the body configured to connect to a tip holder of the friction stir processing device. The non-threaded connecting portion permits the body to be connected to the tip holder without engaging threads of the friction stir processing tip and the tip holder that could bind during a friction stir processing operation. The non-threaded connecting portion including splines configured to receive a torque from the tip holder for rotating the body about the central longitudinal axis.

In another aspect of the present disclosure, a friction stir processing tip is provided for a friction stir processing device. The friction stir processing tip has a body with a central longitudinal axis and a friction stir processing portion. The friction stir processing portion may include, for example, a pin and a shoulder. The body has a connecting portion configured to connect to a tip holder of the friction stir processing device. The connecting portion has splines configured to receive a torque from the body for rotating the tip holder about the central longitudinal axis. The body may have a lateral locating surface axially offset from the splines that extends along the central longitudinal axis. The lateral locating surface may include, for example, a pair of annular locating surfaces on opposite sides of the splines. The lateral locating surface is configured to form a sliding fit connection with the tip holder and keep the central longitudinal axis of the body concentric with an axis of rotation of the tip holder. By keeping the central longitudinal axis of the body concentric with the axis of rotation of the tip holder, the friction stir processing tip inhibits axial run out and vibrations during friction stir processing operations.

The present disclosure also provides a friction stir processing apparatus having a friction stir processing tip and a tip holder. The friction stir processing tip has a central longitudinal axis, a torque receiving structure, and a lateral locating surface axially offset from the torque receiving structure. The torque receiving structure may include at least one of splines, a thread, and a keying structure, as some examples. The tip holder is rotatable about an axis and has a torque transmitting structure configured to engage the torque receiving structure of the friction stir processing tip and cause rotation of the friction stir processing tip with rotation of the tip holder. The torque transmitting structure may include at least one of splines, a thread, and a key as some examples of structures that may cooperate with the torque receiving structure of the friction stir processing tip.

The tip holder has a support surface that forms a sliding fit connection with the lateral locating surface of the friction stir processing tip. The contact between the lateral locating surface of the friction stir processing tip and the support surface of the tool holder keeps laterally directed loads away from the torque receiving structure of the friction stir processing tip during a friction stir processing operation. The separation of torque-receiving and lateral load-receiving portions of the friction stir processing tip permits high speed friction stir processing without the friction stir processing tip binding to the tip holder.

In one aspect of the present disclosure, a method is provided for connecting a friction stir processing to a tip holder of a friction stir processing device. The method includes shifting the friction stir processing tip and the tip holder relative to one another along an axis of rotation of the tip holder to bring together splines of the friction stir processing tip and the tip holder. The method further includes forming a sliding fit connection between the friction stir processing tip and the tip holder. The method further includes securing the friction stir processing tip to the tip holder, such as by engaging a set screw of the tip holder with a recess of the friction stir processing tip.

Regarding FIG. 1, a friction stir processing device 100 is provided that includes a friction stir processing tip 125 and a tool holder 152. The friction stir processing tip 125 has a pin 102 and a shoulder 104 suitable to friction stir metallic workpieces. The friction stir processing device 100 may be connected to a spindle of a machine and used to friction stir process at rotational speeds faster than 10,000 rotations per minute, such as approximately 15,000 rotations per minute. The tool holder 152 includes a tip holder 150 having a socket 101 that receives the friction stir processing tip 125. The tip holder 150 forms a releasable connection 103 with the friction stir processing tip 125. The releasable connection 103 permits the tip holder 150 to apply high axial loads in the Z-axis direction to the friction stir processing tip 125, permits the tip holder 150 to apply high torque loads to the friction stir processing tip 125, and permits the friction stir processing tip 125 to reach temperatures of 500° C. or higher without the friction stir processing tip 125 binding to the tip holder 150. Further, the releasable connection 103 permits the friction stir processing tip 125 to be readily replaced at the end of the lifespan of the friction stir processing tip 125 without having to replace the tip holder 150 and/or tool holder 152.

Figure 2:
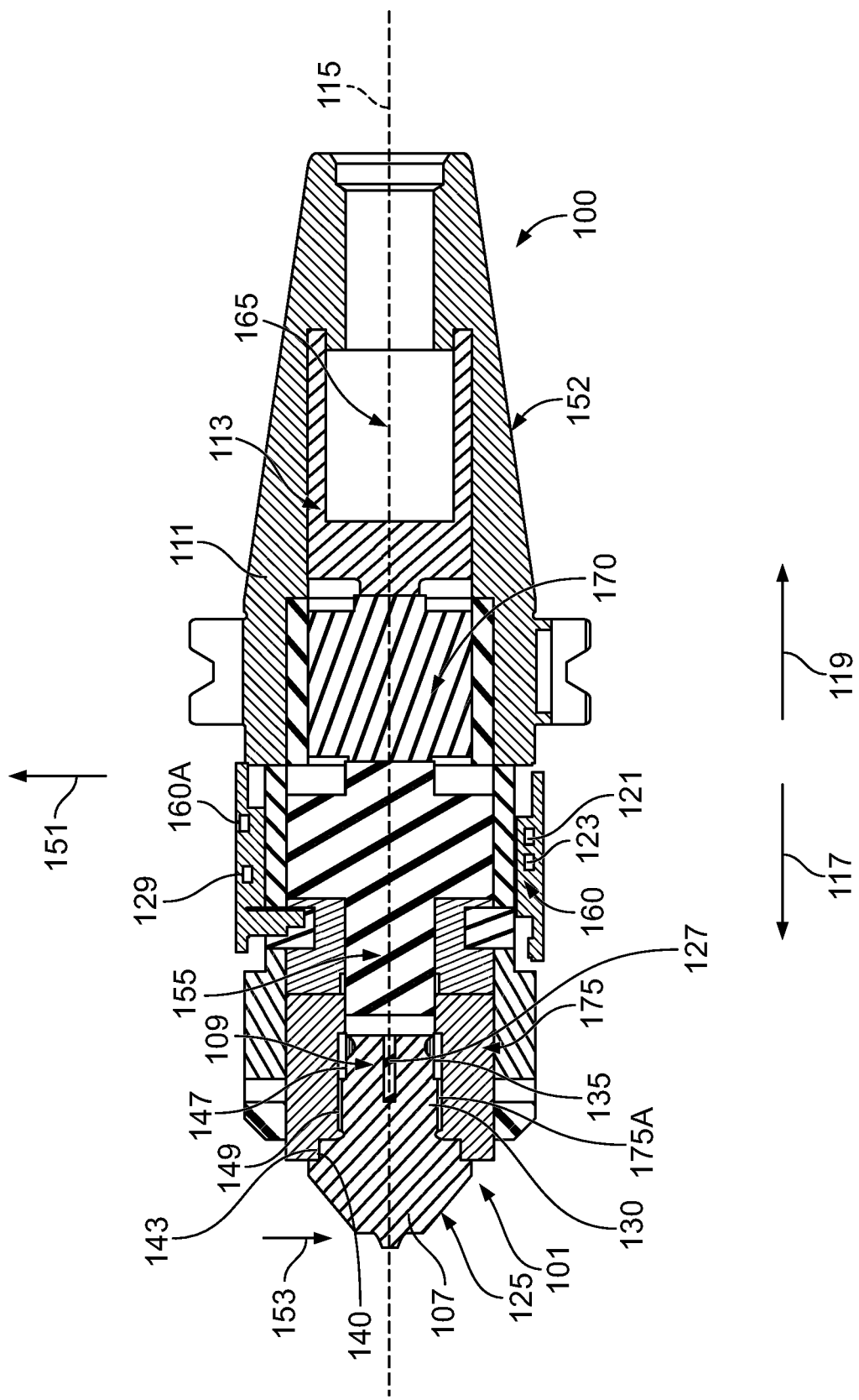
FIG. 2 is a cross sectional view taken across line 2-2 in FIG. 1 showing a connecting portion of the friction stir processing tip received in a tip holder of the friction stir processing device.

Regarding FIG. 2, the friction stir processing tip 125 includes a body 107 having a connecting portion 109 configured to couple to the tip holder 150, which in one form includes a replaceable torque insert 175. The tool holder 152 includes a tool holder body 111 that supports the replaceable torque insert 175. The tool holder 152 also includes an electronics package 160 carried on the tool holder body 111 that receives electrical power from a battery 165. The electronics package 160 may include a processor 160A that is operably coupled to the components of the electronic package 160.

The tool holder body 111 has an internal compartment 113 that houses a load transfer and thermal insulation insert 155, a load cell 170, and a battery 165. The friction stir processing device 100 is rotatable about a longitudinal axis 115 and may be urged in direction 117, which is along a Z-axis of the associated machine, against one or more workpieces by a spindle of the machine. The urging of the friction stir processing device 100 in direction 117 against a workpiece causes the friction stir processing tip 125 to apply a reactionary force in direction 119 against the load transfer and thermal insulation insert 155, which in turn transfers the force in direction 119 to the load cell 170. The processor 160A may receive data from the load cell 170 to facilitate a determination of the force with which the friction stir processing tip 125 presses against a workpiece.

The electronics package 160 has a thermocouple 121 with a probe, such as a wire, that extends into a blind bore 127 of the friction stir processing tip 125 to measure the temperature of the friction stir processing tip 125. The electronics package 160 may include communication circuitry 129 configured to communicate with an associated machine via wireless approaches such as Bluetooth, near field communication, and inductive approaches. In another embodiment, the communication circuitry 129 may utilize wired communication approaches. The electronics package 160 further includes a torque sensor 123 configured to detect the torque applied to the replaceable torque insert 175 and friction stir processing tip 125 held therein.

As shown in FIG. 2, the friction stir processing tip 125, load transfer and thermal insulation insert 155, load cell 170, battery 165, and electronics package 160 are all centered on the longitudinal axis 115. The coaxial alignment of these components reduces the torque the components impart on the friction stir processing device 100 as the friction stir processing device 100 rotates during a friction stir processing operation. The load cell 170 and battery 165 are also positioned proximally along the longitudinal axis 115 to provide a center of gravity of the friction stir processing device 100 close to the spindle, and bearings thereof, holding the friction stir processing device 100. In this manner, the friction stir processing device 100 may be rotated at speeds in excess of 10,000 rotations per minute with minimal wobbling and vibration.

Figure 3:
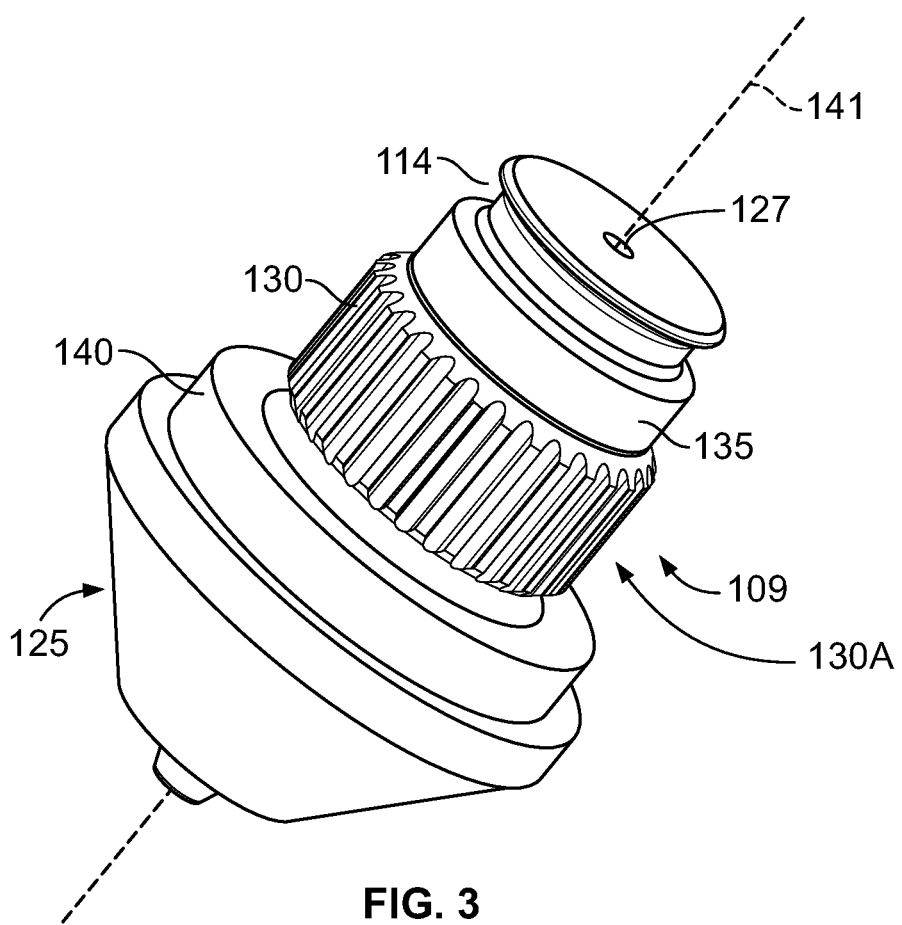
FIG. 3 is perspective view of the friction stir processing tip of FIG. 1 showing splines that engage recesses of the tip holder, lateral locating surfaces axially offset from the splines that form a sliding fit with support surfaces of the tip holder, and a channel that receives a retaining member of the tip holder to keep the friction stir processing tip in the tip holder.

With reference to FIG. 3, the friction stir processing tip 125 has splines 130 and one or more lateral locating surfaces, such as lateral locating surfaces 135, 140, arranged about a central longitudinal axis 141 of the friction stir processing tip 125. The splines 130 may include, for example, 10 or more splines, 15 or more splines, or 20 or more splines.

The friction stir processing tip 125 has a recess, such as an annular channel 114, that receives a retaining member of the friction stir processing device 100, such as a set screw. The engagement between the retaining member and the annular channel 114 keeps the friction stir processing tip 125 from falling out of the replaceable torque insert 175. In one embodiment, the splines 130 are involute splines and the lateral locating surfaces 135, 140 are smooth, annular surfaces. The lateral locating surfaces 135, 140 of the friction stir processing tip 125 form a sliding fit connection between the lateral locating surfaces 135, 140 and one or more support surfaces, such as support surfaces 143, 147 (see FIG. 2) of the replaceable torque insert 175. The sliding fit is sized to provide enough clearance to permit the friction stir processing tip 125 to be loaded into the replaceable torque insert 175 without significant frictional resistance, while being tight enough to inhibit tilting of the friction stir processing tip 125 within the replaceable torque insert 175. In one embodiment, the sliding fit is defined according to the ANSI B4.1-1967 standard.

Figure 4:
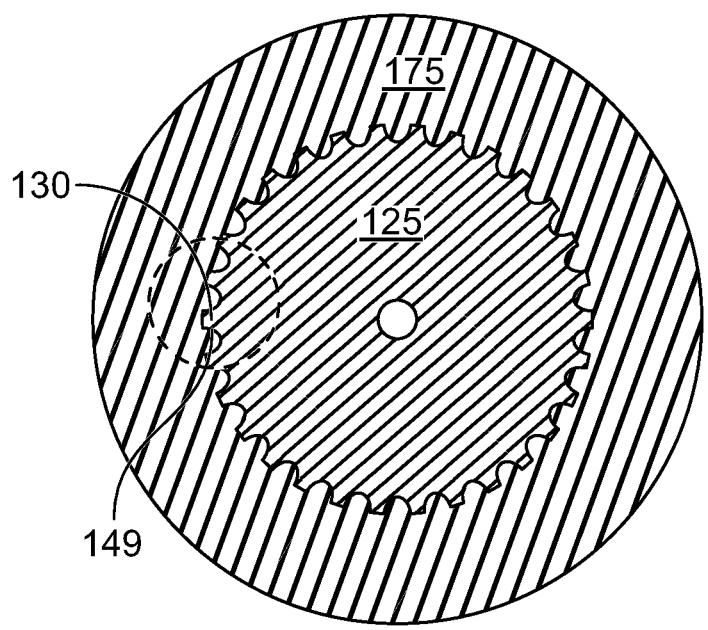
FIG. 4 is a cross sectional view taken across line 4-4 in FIG. 1 showing the splines of the friction stir processing tip engaged with recesses of the tip holder.

Regarding FIG. 2, to connect the friction stir processing tip 125 to the replaceable torque insert 175, the connecting portion 109 is advanced in direction 119 into an opening 175A of the replaceable torque insert 175. The splines 130 of the friction stir processing tip 125 are rotationally aligned with recesses 149 (see FIG. 4) of the replaceable torque insert 175 and the longitudinal movement in direction 119 slides the splines 130 into the recesses 149. The machine spindle moves the friction stir processing device 100 in lateral direction 151 across a workpiece during a friction stir processing operation, which imparts a force in lateral direction 153 against the friction stir processing tip 125. The support surfaces 143, 147 provide reactionary forces, in radially inward directions against the friction stir processing tip 125, to counteract the loading in lateral direction 153 against the friction stir processing tip 125 and resist tilting of the friction stir processing tip 125 within the replaceable torque insert 175. The support surfaces 143, 147 thereby keep the central longitudinal axis 141 of the friction stir processing tip 125 coaxial with the longitudinal axis 115 and inhibit axial lead-out of the friction stir processing tip 125. Further, the lateral support surfaces 135, 140 absorb the lateral loads so that the splines 130 may only be subjected to torque loads, which reduces binding between the friction stir processing tip 125 and the replaceable torque insert 175.

With reference to FIG. 3, the lateral locating surfaces 135, 140 of the friction stir processing tip 125 are offset from the splines 130 along the central longitudinal axis 141 of the friction stir processing tip 125. In this manner, the lateral supporting surfaces 135, 140 are separate from the torque-receiving structure 130A including the splines 130. Because the lateral support surfaces 135, 140 center the friction stir processing tip 125 in the replaceable torque insert 175, the splines 130 and recesses 149 may have small gaps 157 (see FIG. 5) therebetween that facilitate insertion and removal of the splines 130 into the recesses 149. The small gaps 157 also provide clearance for thermal expansion of the friction stir processing tip 125 during a friction stir processing operation.

Figure 5:
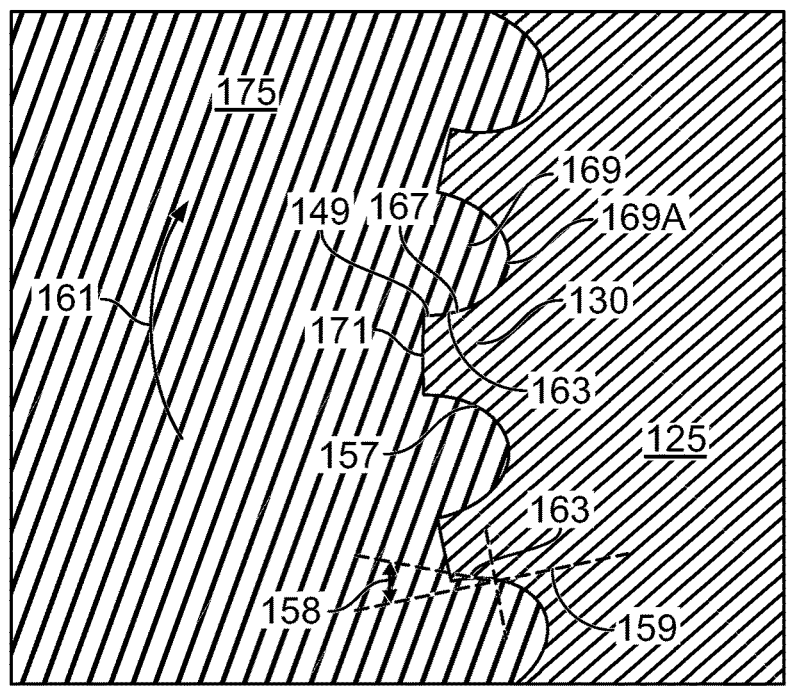
FIG. 5 is an enlarged view of the area within the dashed circle in FIG. 4 showing the torque-transferring surfaces of the splines of the friction stir processing tip and the recesses of the tip holder.

Regarding FIG. 5, the replaceable torque insert 175 may rotate in direction 161 which circumferentially shifts the replaceable torque insert 175 in direction 161 relative to the friction stir processing tip 125. Rotation of the replaceable torque insert 175 in direction 161 presses surfaces of the splines 130 and recesses 149 together, such as torque transferring surfaces 163, 167 of the splines 130 and recesses 149 and closes the gap 157 therebetween. The splines 130 may be involute splines and have a pressure angle 158 between the torque-transferring surface 163 and a radius 159 of the friction stir processing tip 125. As shown in FIG. 5, the recesses 149 are defined by splines 169 and lands 171 of the replaceable torque insert 175. The splines 169 of the replaceable torque insert 175 extend into recesses 169A of the friction stir processing tip 125.

Regarding FIG. 3, the friction stir processing tip 125 may have a unitary, one-piece construction. In other embodiments, the friction stir processing tip 125 is made of two or more assembled components. The body 107 may be made of a single material, be made of a first material coated with a second material, or be made of a base material with a plurality of layers as some examples. The body 107 of the friction stir processing tip 125 may include one or more ultrahard materials and/or one or more super abrasive materials. Suitable ultrahard materials include tungsten carbide, tungsten lanthanum, tungsten alloys, and steel. Examples of suitable steels include H13 steel and MP159 steel. Suitable super abrasive materials include polycrystalline cubic boron nitride (PCBN) and polycrystalline diamond. As an example, the friction stir processing tip 125 may be made of an ultrahard material such as H13 steel with a coating, the coating being one or more of a carbide coating, PCBN, tungsten lanthanum, or diamond particulates in a metal matrix.

Figure 6:
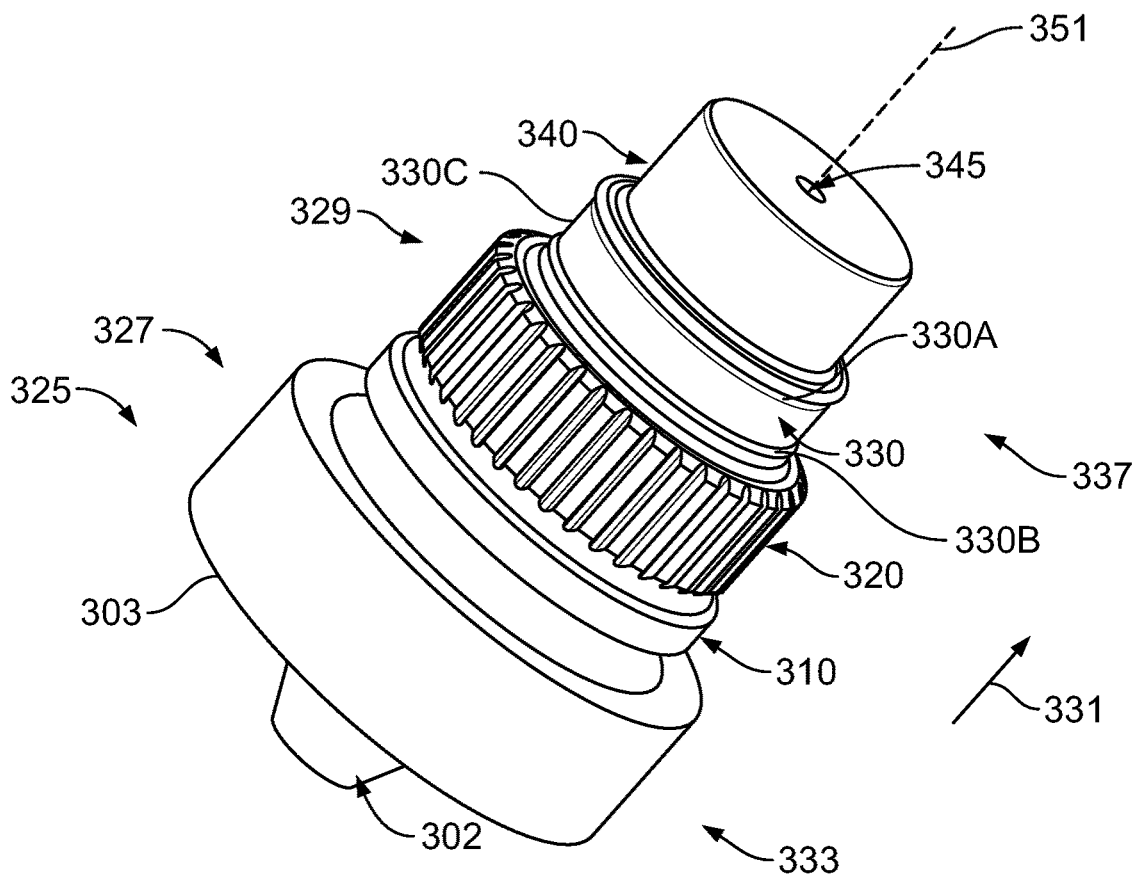
FIG. 6 is a perspective view of another friction stir processing tip having splines, lateral locating surfaces, and a channel for receiving a retaining member.

Regarding FIG. 6, a friction stir processing tip 325 is provided that is similar in many respects to the friction stir processing tip 125 discussed above. The friction stir processing tip 325 has a friction stir processing portion 327 including a pin 302 and a shoulder 303. The friction stir processing portion 327 may include surface features on the pin 302 and shoulder 303 to create material flow and generate heat. The friction stir processing tip 325 also has a connecting portion 329 that includes lateral locating surfaces 310, 340, splines 320, and a channel 330. The channel 330 is configured to receive a retaining member, such as a set screw, to keep the friction stir processing tip 325 within a tip holder. The lateral locating surface 340 has a smaller outer diameter that the outer diameter of the lateral locating surface 310 and the splines 320 to permit the friction stir processing tip 325 to be advanced in direction 331 into the socket of a tool holder.

The friction stir processing tip 325 has a distal end portion 333 and a proximal end portion 337. The lateral locating surfaces 310, 340 are configured to form sliding fit connections with support surfaces of tip holder 150. The sliding fit connections between the lateral locating surfaces 310, 340 of the friction stir processing tip 325 and the tip holder permit the lateral locating surfaces 310, 340 to absorb lateral loading rather than the splines 320. Because the lateral locating surfaces 310, 340 absorb lateral loading, an appropriate amount of play may be provided between the splines 320 of the friction stir processing tip 325 and recesses of the associated tip holder to permit the splines 320 of the friction stir processing tip 325 to be advanced into the recesses of the tip holder.

The sliding fit connections formed between the lateral locating surfaces 310, 340 and the support surfaces of the tip holder also keep the friction stir processing tip 325 centered in the tool holder which prevents planetary gear-type movement of the friction stir processing tip 325 in the tip holder. In this manner, the locating surfaces 310, 340 inhibit galling between the friction stir processing tip 325 and the tip holder. Further, because the splines 320 may be subjected to only a torque load, the friction stir processing tip 325 inhibits binding between the splines 320 of the friction stir processing tip 325 and the recesses of the tip holder.

Regarding FIG. 6, the friction stir processing tip 325 may further include a blind bore 345. The blind bore 345 may receive a thermocouple probe for measuring the temperature of the friction stir processing tip 325.

The friction stir processing tip 325 also includes an annular channel 330 for receiving a retaining member. The channel 330 includes radially extending side walls 330A, 330B and a cylindrical surface 330C extending axially therebetween. For example, the retaining member may be a set screw that extends from a tip holder such as tip holder 150. The set screw may contact the side walls 330A, 330B of the channel 330 and inhibit the friction stir processing tip 325 from falling out of the tip holder.

The pin 302, shoulder 303, locating surfaces 310, 340, splines 320, channel 330, and blind bore 345 may be formed concentrically about a central longitudinal axis 351 of the friction stir processing tip 325. The concentric arrangement of the structures of the friction stir processing tip 325 helps limit radial lead-out of the friction stir processing tip 325 during a friction stir processing operation.

The splines 320 may be, for example, involute splines. The splines 320 may be arranged in a contiguous circular pattern about the central longitudinal axis 351 of the friction stir processing tip 325. The splines 320 may each be straight and extend parallel to the central longitudinal axis 351 of the friction stir processing tip 325. In another embodiment, the splines 320 may each be curved and extend helically about the central longitudinal axis 351.

Figure 7:
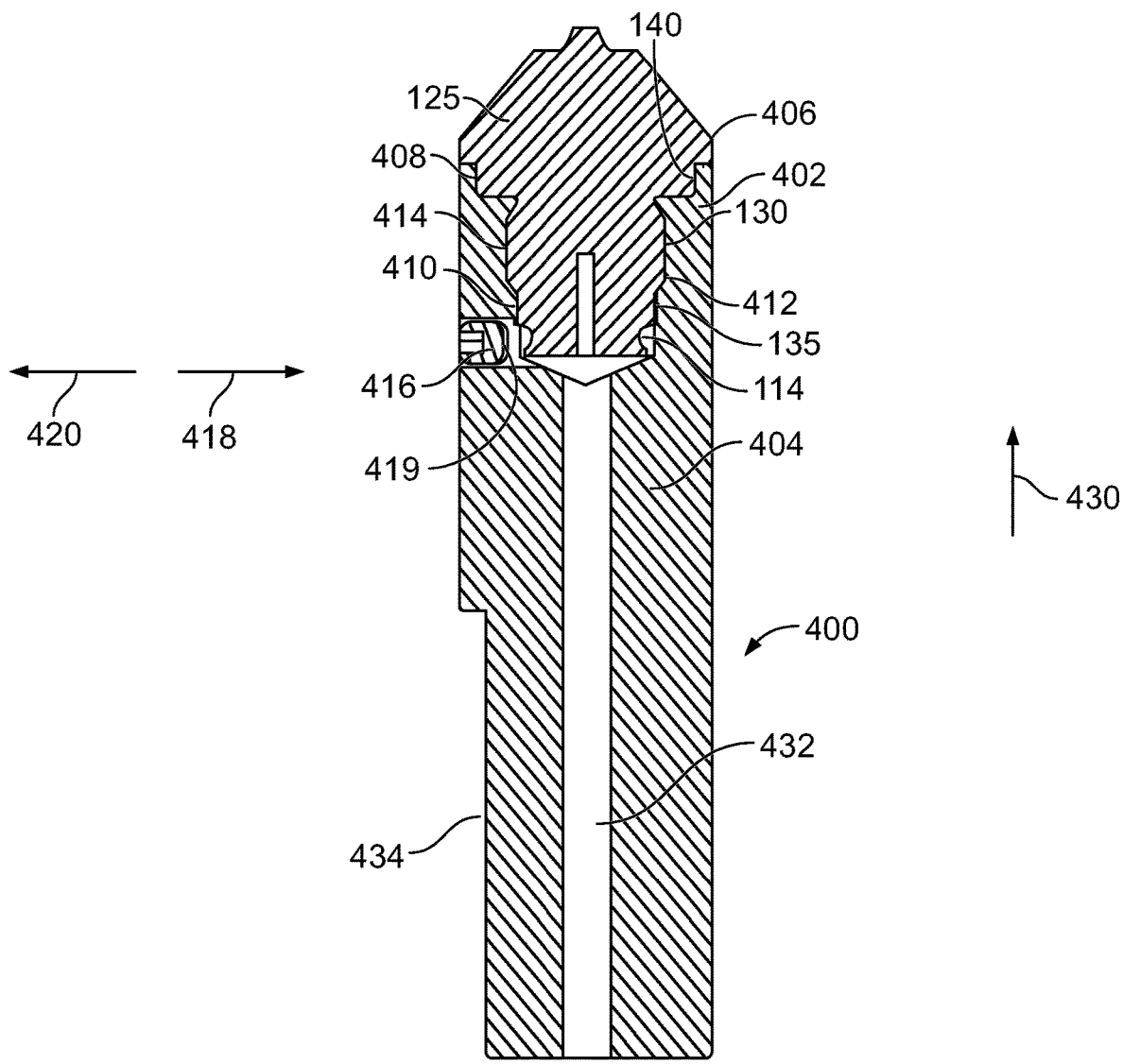
FIG. 7 is a cross-sectional view of the friction stir processing tip of FIG. 3 received in a shank-style tool holder.

Regarding FIG. 7, the friction stir processing tip 125 may be utilized in a friction stir processing device 400. The friction stir processing device 400 includes a tip holder 402 having a body 404 with a socket 406 that receives the friction stir processing tip 125. The tip holder 402 includes support surfaces 408, 410 that form sliding fit connections with the lateral locating surfaces 135, 140 of the friction stir processing tip 125. The tip holder 402 includes recesses 412 that receive the splines 130 of the friction stir processing tip 125 and splines 414 that intermesh with the splines 130. To retain the friction stir processing tip 125 in the socket 406, the friction stir processing device 400 includes a retaining member, such as a set screw 416, shiftable in a radially inward direction 418 until a leading end portion 419 extends into the channel 114 of the friction stir processing tip 125. To remove the friction stir processing tip 125, the set screw 416 is shifted radially outward in direction 420 and the friction stir processing tip 125 is removed in direction 430 out of the socket 406. The tip holder 402 may also include a through bore 432 to permit a probe of a thermocouple of the associated machine to extend into the blind bore 127 of the friction stir processing tip 125. Further, the tip holder 402 may include a notch 434 to receive a set screw that keys the body 404 within a spindle.

Figure 8:
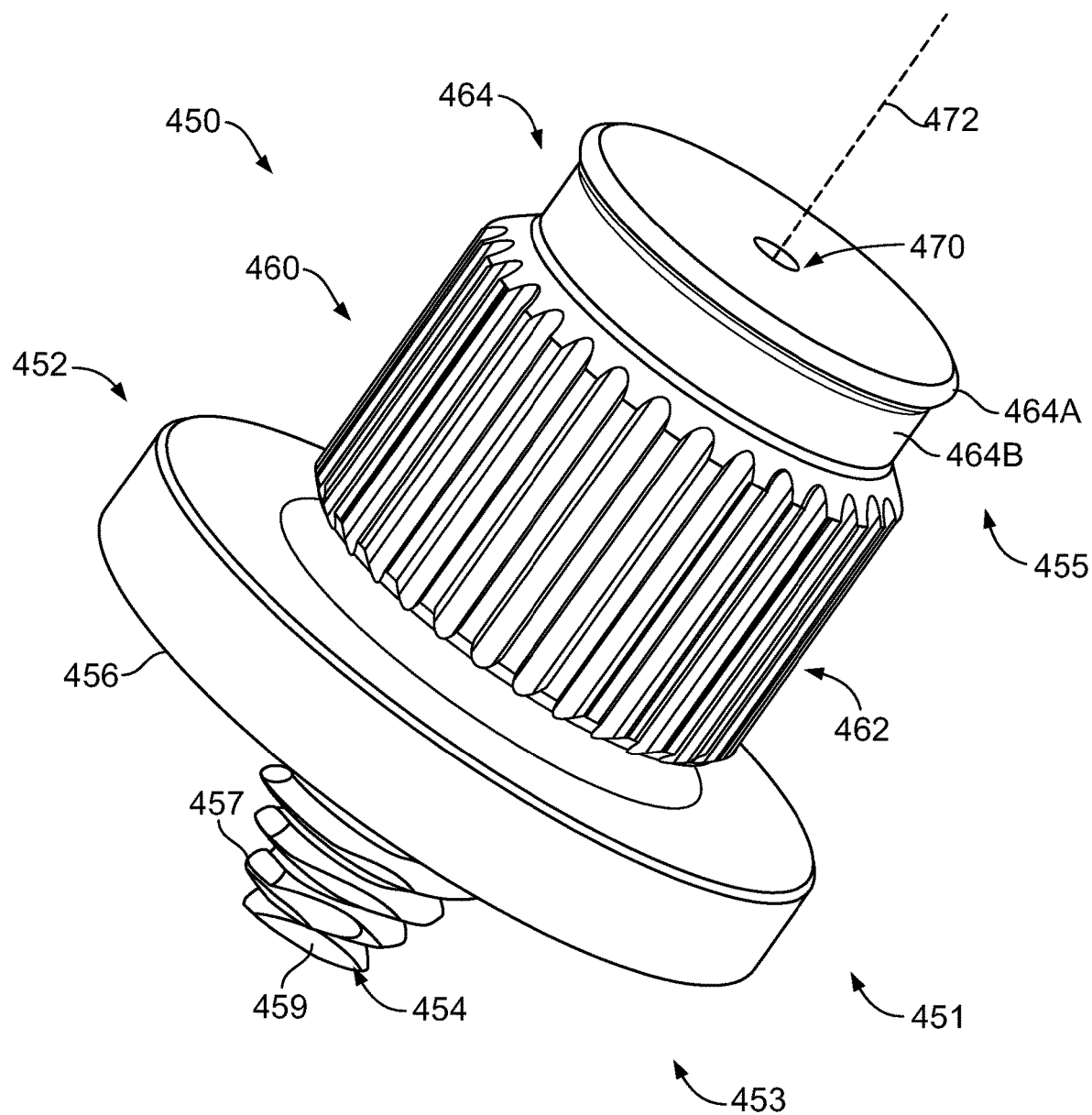
FIG. 8 is a perspective view of another friction stir processing tip having splines and a channel for receiving a retaining member.

Regarding FIG. 8, a friction stir processing tip 450 is provided that is similar in many respects to the friction stir processing tip 125 and friction stir processing tip 325 discussed above. The friction stir processing tip 450 includes a body 451 that has a distal end portion 453 and a proximal end portion 455. The friction stir processing tip 450 has a friction stir processing portion 452 including a pin 454 and a shoulder 456. The friction stir processing portion 452 may include surface features on the pin 454 and/or the shoulder 456 to create material flow and generate heat. For example, the pin 454 may have helical features such as threads 457 and may also include flats 459 of the threads 456.

The friction stir processing tip 450 also has a connecting portion 460 that includes splines 462 and a channel 464. The splines 462 may be, for example, involute splines. The splines 462 may be arranged in a contiguous circular pattern about a central longitudinal axis 472 of the friction stir processing tip 450. The splines 462 may be evenly spaced about the central longitudinal axis 472 of the friction stir processing tip 450. The splines 462 may each be straight and extend parallel to the central longitudinal axis 472. In another embodiment, the splines 462 may each be curved and extend helically about the central longitudinal axis 472.

The splines 462 may be configured to form a sliding fit connection with a corresponding tip holder such as tip holder 152. The splines 462 may be sized to provide enough clearance to permit the friction stir processing tip 450 to be loaded into the tool holder without significant frictional resistance, while being tight enough to inhibit tilting of the friction stir processing tip 450 within the tool holder.

The channel 464 includes an annular rim 464A and a cylindrical surface 464B that extends axially between the annular rim 464A and the splines 462. The channel 464 is configured to receive a retaining member to keep the friction stir processing tip 450 within a tip holder. For example, the retaining member may be a set screw that extends from a tip holder such as tip holder 150. The set screw may contact one or both of the annular rim 464A and the cylindrical surface 464B and inhibit the friction stir processing tip 450 from falling out of the tip holder.

The friction stir processing tip 450 may further include a blind bore 470. The blind bore 470 may receive a thermocouple probe for measuring the temperature of the friction stir processing tip 450.

The pin 454, shoulder 456, splines 462, channel 464, and blind bore 470 may be formed concentrically about a central longitudinal axis 472 of the friction stir processing tip 450. The concentric arrangement of the structures of the friction stir processing tip 450 helps limit radial lead-out of the friction stir processing tip 450 during a friction stir processing operation.

While there have been illustrated and described particular embodiments of the present invention, it will be appreciated that numerous changes and modifications will occur to those skilled in the art, and it is intended for the present invention to cover all those changes and modifications which fall within the scope of the appended claims. It is intended that the phrase "at least one of" as used herein be interpreted in the disjunctive sense. For example, the phrase "at least one of A and B" is intended to encompass A, B, or both A and B.

What is claimed is:

1. A friction stir processing tip for a friction stir processing device, the friction stir processing tip comprising:
   a body having a central longitudinal axis;
   a friction stir processing portion of the body;
   a non-threaded connecting portion of the body configured to connect to a tip holder of the friction stir processing device; and
   splines of the non-threaded connecting portion configured to receive a torque from the tip holder for rotating the body about the central longitudinal axis;
   wherein the splines are arranged in a contiguous circular pattern about the central longitudinal axis;
   wherein the splines each have a longitudinal torque surface extending at 60 degrees or less relative to a radial direction of the splines.

2. The friction stir processing tip of claim 1 wherein the splines include elongate axial splines extending along the central longitudinal axis.

3. The friction stir processing tip of claim 1 wherein the splines extend parallel to the central longitudinal axis.

4. The friction stir processing tip of claim 1 wherein the splines are straight.

5. The friction stir processing tip of claim 1 wherein the splines are non-helical.

6. The friction stir processing tip of claim 1 wherein the splines are involute splines.

7. The friction stir processing tip of claim 1 wherein the connecting portion includes a recess to receive a retaining member.

8. The friction stir processing tip of claim 7 wherein the splines are intermediate the recess and the friction stir processing portion along the central longitudinal axis.

9. A friction stir processing tip for a friction stir processing device, the friction stir processing tip comprising:
   a body having a central longitudinal axis;
   a friction stir processing portion of the body;
   a non-threaded connecting portion of the body configured to connect to a tip holder of the friction stir processing device; and
   splines of the non-threaded connecting portion configured to receive a torque from the tip holder for rotating the body about the central longitudinal axis;
   wherein the splines each include a pair of opposite concave surfaces and a radially outer surface connecting the concave surfaces and forming axially extending junctures with the concave surfaces.

10. The friction stir processing tip of claim 1 wherein the body is made of a material configured to withstand the heat and forces generated during a friction stir processing operation.

11. The friction stir processing tip of claim 1 wherein the body is of an ultrahard material.

12. The friction stir processing tip of claim 1 wherein the friction stir processing portion includes at least one of a pin and a shoulder.

13. A friction stir processing tip for a friction stir processing device, the friction stir processing tip comprising:
   a body having a central longitudinal axis;
   a friction stir processing portion of the body;
   a connecting portion of the body configured to connect to a tip holder of the friction stir processing device, the connecting portion including:
      splines configured to receive a torque from the tip holder for rotating the body about the central longitudinal axis; and
      a lateral locating surface axially offset from the splines and extending along the central longitudinal axis, the lateral locating surface configured to form a sliding fit connection with the tip holder and keep the central longitudinal axis of the body concentric with an axis of rotation of the tip holder;
   wherein the lateral locating surface includes a distal lateral locating surface intermediate the splines and the friction stir processing portion of the body and a proximal lateral locating surface on an opposite side of the splines from the distal lateral support surface;
   wherein the distal and proximal lateral locating surfaces are annular; and
   wherein the distal lateral locating surface has a first outer diameter and the proximal lateral locating surface has a second outer diameter less than the first diameter.

14. A friction stir processing tip for a friction stir processing device, the friction stir processing tip comprising:
   a body having a central longitudinal axis;
   a friction stir processing portion of the body;
   a connecting portion of the body configured to connect to a tip holder of the friction stir processing device, the connecting portion including:
      splines configured to receive a torque from the tip holder for rotating the body about the central longitudinal axis; and
      a lateral locating surface axially offset from the splines and extending along the central longitudinal axis, the lateral locating surface configured to form a sliding fit connection with the tip holder and keep the central longitudinal axis of the body concentric with an axis of rotation of the tip holder;
   wherein the splines are arranged in a contiguous circular pattern about the central longitudinal axis;
   wherein the splines each have a longitudinal torque surface extending at 60 degrees or less relative to a radial direction of the splines.

15. The friction stir processing tip of claim 14 wherein the lateral locating surface includes a pair of lateral locating surfaces on opposite sides of the splines along the central longitudinal axis of the body.

16. The friction stir processing tip of claim 14 wherein the lateral locating surface includes a distal lateral locating surface intermediate the splines and the friction stir processing portion of the body and a proximal lateral locating surface on an opposite side of the splines from the distal lateral support surface.

17. The friction stir processing tip of claim 14 wherein the body has a unitary, one-piece construction.

18. The friction stir processing tip of claim 14 wherein the body includes an annular channel for receiving a retaining member of the tip holder.

19. The friction stir processing tip of claim 18 wherein the annular channel is located proximal of the splines along the central longitudinal axis of the body.

20. The friction stir processing tip of claim 14 wherein the splines are parallel to the central longitudinal axis.

21. The friction stir processing tip of claim 14 wherein the friction stir processing portion of the body includes a shoulder and a pin.

22. The friction stir processing tip of claim 14 wherein the splines are involute splines.

23. The friction stir processing tip of claim 14 wherein the body is made of an ultrahard metallic material.

24. The friction stir processing tip of claim 9 wherein the splines include elongate axial splines extending along the central longitudinal axis.

25. The friction stir processing tip of claim 9 wherein the splines extend parallel to the central longitudinal axis.

26. The friction stir processing tip of claim 9 wherein the splines are straight.

27. The friction stir processing tip of claim 9 wherein the splines are non-helical.

28. The friction stir processing tip of claim 9 wherein the splines are involute splines.

29. The friction stir processing tip of claim 9 wherein the connecting portion includes a recess to receive a retaining member.

30. The friction stir processing tip of claim 29 wherein the splines are intermediate the recess and the friction stir processing portion along the central longitudinal axis.

31. The friction stir processing tip of claim 9 wherein the body is made of a material configured to withstand the heat and forces generated during a friction stir processing operation.

32. The friction stir processing tip of claim 9 wherein the body is of an ultrahard material.

33. The friction stir processing tip of claim 9 wherein the friction stir processing portion includes at least one of a pin and a shoulder.

34. The friction stir processing tip of claim 13 wherein the body has a unitary, one-piece construction.

35. The friction stir processing tip of claim 13 wherein the body includes an annular channel for receiving a retaining member of the tip holder.

36. The friction stir processing tip of claim 35 wherein the annular channel is located proximal of the splines along the central longitudinal axis of the body.

37. The friction stir processing tip of claim 13 wherein the splines are parallel to the central longitudinal axis.

38. The friction stir processing tip of claim 13 wherein the friction stir processing portion of the body includes a shoulder and a pin.

39. The friction stir processing tip of claim 13 wherein the splines are involute splines.

40. The friction stir processing tip of claim 13 wherein the body is made of an ultrahard metallic material.

\* \* \* \* \*